(12) United States Patent
Zawilinski et al.

(10) Patent No.: US 12,092,236 B2
(45) Date of Patent: Sep. 17, 2024

(54) POSITIONING VALVE CONTROL SYSTEM

(71) Applicant: Hamilton Sundstrand Corporation, Charlotte, NC (US)

(72) Inventors: David J. Zawilinski, W. Granby, CT (US); Scott W. Simpson, Feeding Hills, MA (US); Robert B. Goodman, West Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 188 days.

(21) Appl. No.: 17/716,584

(22) Filed: Apr. 8, 2022

(65) Prior Publication Data

US 2023/0323976 A1    Oct. 12, 2023

(51) Int. Cl.
*F16K 31/04* (2006.01)
*F15B 11/028* (2006.01)
*F15B 21/042* (2019.01)

(52) U.S. Cl.
CPC .......... *F16K 31/043* (2013.01); *F15B 11/028* (2013.01); *F15B 21/042* (2013.01); *F16K 31/046* (2013.01); *F15B 2211/305* (2013.01)

(58) Field of Classification Search
CPC . F15B 21/042; F15B 2211/305; F16K 31/046
See application file for complete search history.

(56) References Cited

U.S. PATENT DOCUMENTS

| | | | |
|---|---|---|---|
| 3,065,735 A | 11/1962 | Chaves, Jr. et al. | |
| 3,362,296 A | 1/1968 | Gray et al. | |
| 3,468,221 A | 9/1969 | Johnson | |
| 3,565,391 A | 2/1971 | Zannini | |
| 3,812,765 A | 5/1974 | Himmler | |
| 10,267,430 B2* | 4/2019 | Simpson | F02C 9/18 |
| 10,473,128 B2 | 11/2019 | Schaber | |
| 2012/0199211 A1 | 8/2012 | Schroder et al. | |
| 2020/0232577 A1 | 7/2020 | Dehais | |

OTHER PUBLICATIONS

European Search Report for EP Application No. 23166800.5 dated Aug. 2, 2023.

* cited by examiner

*Primary Examiner* — Eric Keasel
(74) *Attorney, Agent, or Firm* — Carlson, Gaskey & Olds, P.C.

(57) ABSTRACT

A valving system has an actuator member connected to move with an actuator piston and change the position of a valve member. There is a smaller face fluid chamber acting on a small area piston face, and a larger face fluid chamber acting on a larger face of the actuator piston. The torque motor has an armature and a flapper caused to move by current received at the armature. The flapper moves between two fluid ports to control the pressure in the larger face chamber. The flapper further has a positioning extension engaging a first feedback spring operable between it and a forward face of the actuator piston and providing a spring force in combination with a spring force from the positioning extension. A control is operable to provide current to the armature to control the fluid received in the larger face chamber. The controller is programmed to associate the current supplied to the armature to an actual position of the valve member. A method is also disclosed.

20 Claims, 4 Drawing Sheets

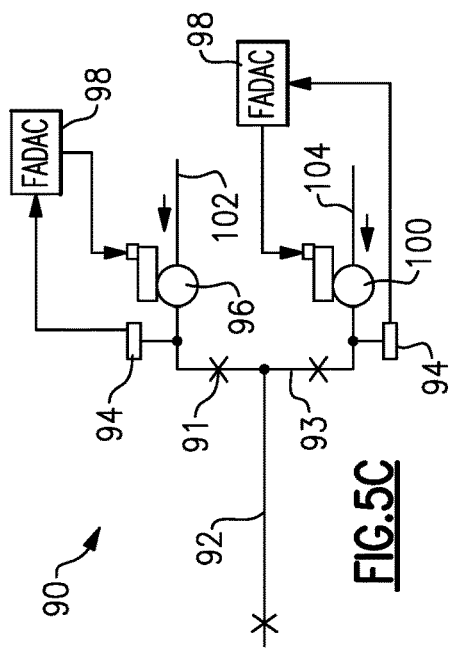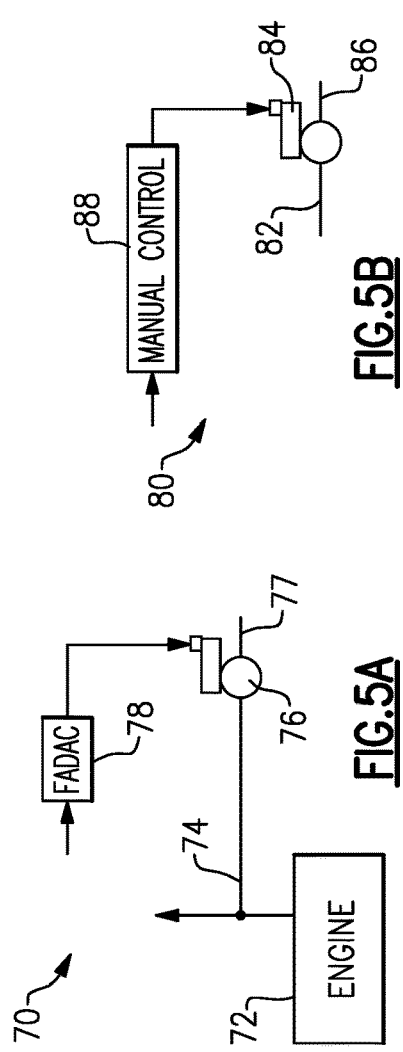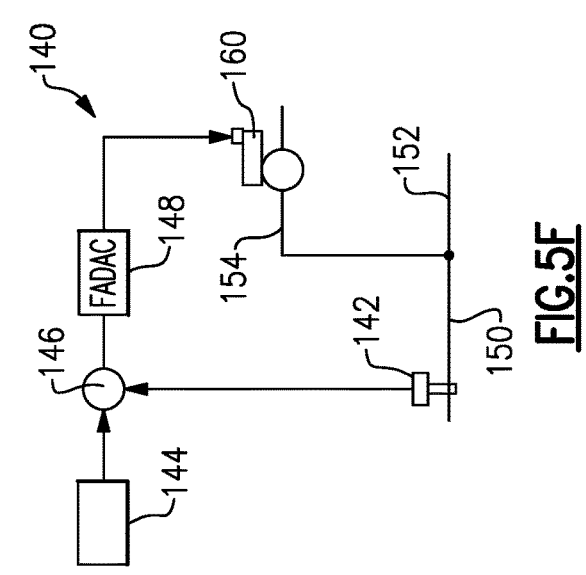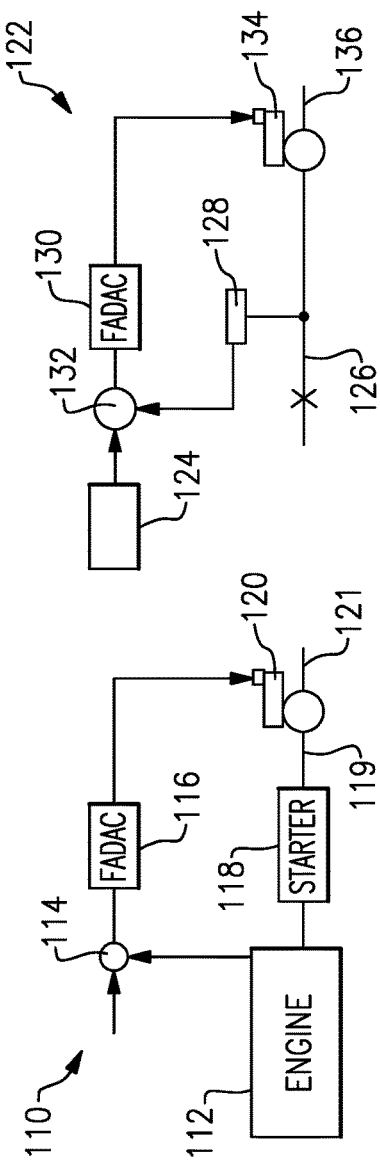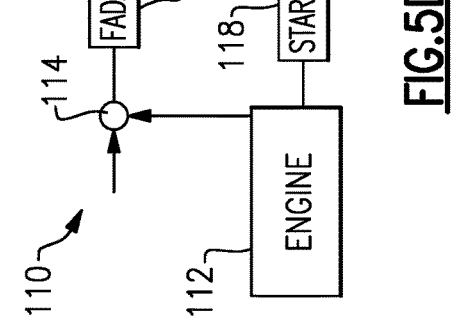

POSITIONING VALVE CONTROL SYSTEM

BACKGROUND

This application relates to a system that provide accurate feedback on the position of a valve without the use of any transducer.

Valve actuators are utilized in any number of applications. In general, a piston is moved by fluid pressure to move an actuator member that controls the position of a valve. As one example, a butterfly valve is connected to be moved by an actuator member between open and closed positions within a fluid duct.

Generally, control systems that need accurate feedback on the position of the valve require some sort of transducer such as linear variable differential transducers or rotary variable differential transducers. The inclusion of such members raises the cost and complexity of the valving system.

SUMMARY

A valving system has a valve member received within a fluid duct to control the flow of fluid between a duct inlet to a duct outlet. An actuator member is connected to move with an actuator piston and change the position of the valve member. The actuator piston moves within a housing. The housing defines a smaller face fluid chamber acting on a small area piston face, and a larger face fluid chamber acting on a larger face of the actuator piston. The larger face is on a remote side of said piston from the small face of the piston. The torque motor has an armature and a flapper caused to move by current received at the armature from a control. The flapper moves between two fluid ports to control the opening of the two fluid ports and control the pressure in the large face chamber. The flapper further has a positioning extension engaging a first feedback spring operable between it and a forward face of said actuator piston for providing a spring force in combination with a spring force from the positioning extension. The control is operable to provide current to the armature to control the fluid received in the large face chamber from the first and second fluid ports. The controller is programmed to associate the current supplied to the armature to an actual position of the valve member.

A method is also disclosed.

A method of operating a valving system is also disclosed.

These and other features will be best understood from the following drawings and specification, the following is a brief description.

BRIEF DESCRIPTION OF THE DRAWINGS

FIG. 5A shows a valve application.

FIG. 5B shows an alternative valve application.

FIG. 5C shows another alternative valve application.

FIG. 5D shows another alternative valve application.

FIG. 5E shows another alternate valve application.

FIG. 5F shows another alternate valve application.

DETAILED DESCRIPTION

Figure 1:
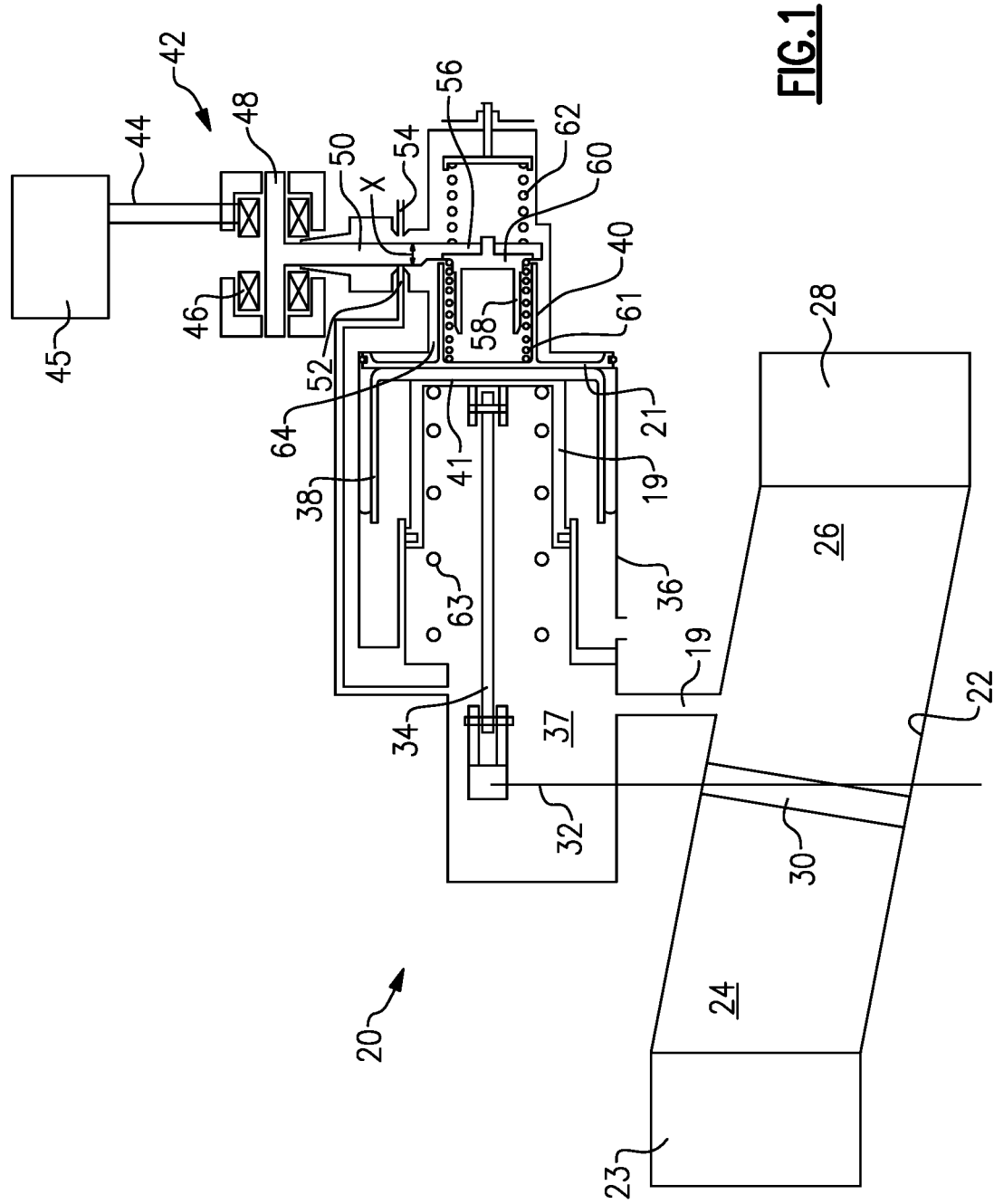
FIG. 1 shows a positioning valve in a closed position.

FIG. 1 shows a valving system 20 utilized as a positioning valve. System 20 includes a fluid duct 22 having an inlet 24 communicating with a source of pressurized air 23, such as a main compressor in a gas turbine engine. An outlet 26 of the duct 22 communicates with a use 28. As examples of uses, starter air valves with the below disclosure will allow control of the starter speed so that engine rotors can be cooled at a controlled rate to avoid distorting and damaging the rotor. Also, fan air valves with this disclosure will eliminate need for a separate position feedback device. Any valve that would typically require position control or feedback for stability would benefit from this technology.

The position of a butterfly valve disc 30 within the duct 22 controls the communication of air from the inlet 24 to the outlet 26. Butterfly valve 30 is shown in a closed position in FIG. 1. An actuator member 32 is driven by a piston rod 34 which moves within a piston housing 36 defining a first fluid chamber 37. Piston rod 34 is connected to an actuator piston 38.

The actuator piston includes a smaller face piston 19 having a first smaller area seeing the pressure in chamber 37. A larger face piston 21 sees the pressure in chamber 64. In one embodiment, the face area of piston 19 might be half that of piston 21, of course other ratios may be used. At any rate the pressure in chamber 64 acts on a larger surface area on face 21 than the area over which the pressure in chamber 37 acts on piston 19. The larger face piston 21 has a cylindrical dome spring guide 40 extending away from a forward face 41 of the piston 38 on an opposed side of the rod 34. A torque motor 42 contains an armature 46 receiving current 44 from a controller 45, that may be a Full Authority Digital Electronic Controller 45 ("FADEC"). Alternatively, a dedicated control may be used.

As known, a torque motor flapper 48 includes an arm 50 which selectively blocks or opens ports 52 and 54. As shown in this Figure, the flapper 50 closes the port 52 and opens the port 54. Port 52 is connected to the source of air downstream of the butterfly valve 30 through line 19, and port 54 is connected to an ambient pressure. Torque motors are known, and are utilized to control the pressure of fluids delivered into chamber 64 to move an actuator piston, such as piston 38. However, torque motor 42 is unique in that the flapper 50 extends to a positioning extension 56 having a positioning piston 60. A typical torque motor flapper would end at line X, however, torque motor 42 has extension 56. Note line X is included only for reference; it is not found on the actual flapper. Spring 61 is positioned between the forward face 41 of the piston 38 and received within the dome 40. Spring 61 is also received outwardly of a cylindrical portion 58 of positioning piston 60. Spring 61 provides feedback on the position of piston 38. Spring 61 provides a feedback force $F_{fb}$.

A second spring 62 is positioned against the positioning extension 56 on a remote side of the flapper extension 56 from the spring 61. Second spring provides a force F1. As shown in this position, spring 63 and pressure forces in chamber 37 act on piston 38 such that it is moved to the right, compressing spring 61. The force from chamber 64 acts against the forces from spring 63 and chamber 37.

In this position, the flapper is exerting a spring force $F_{fm}$. While prior torque motors have a high spring rate, in this embodiment the spring rate is lower.

In FIG. 1 the flapper 50 opens part 54 so lower pressure air is connected to chamber 64. Thus the piston is in the closed position.

Figure 2:
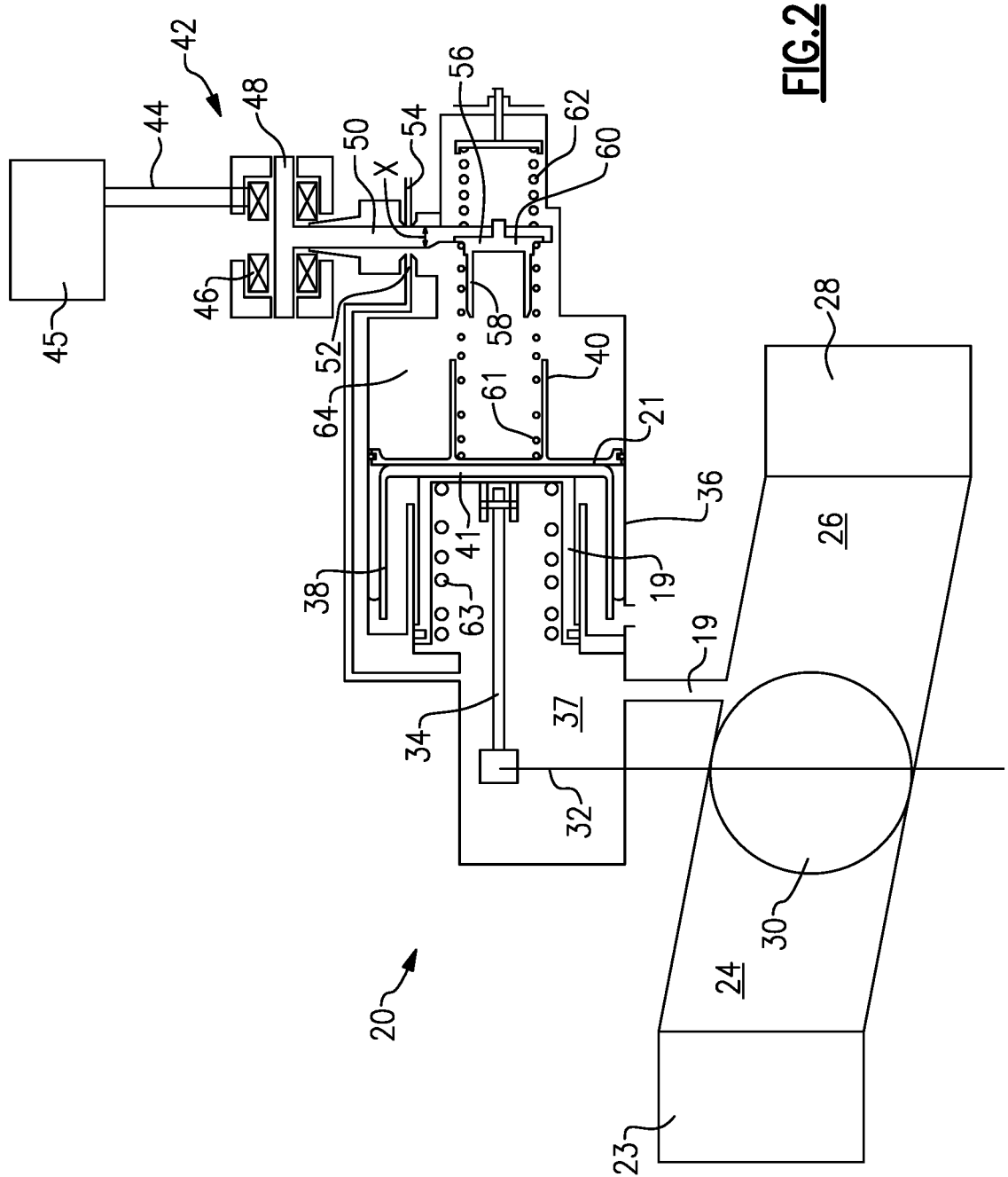
FIG. 2 shows the FIG. 1 valve having moved to an open position.

FIG. 2 shows valving system 20 with the valve piston 38 having moved to the left from the FIG. 1 position such that the butterfly valve 30 is now open. In this position flapper 50 now opens part 52 so higher pressure air is delivered into the chamber to cause piston 38 to move. While a butterfly valve in particular is disclosed, the teachings of this disclosure would extend to other types of valves moved by linear actuators.

As can be seen, the flapper 50 has now pivoted to the left, closing port 54 and opening port 52. Positions intermediate fully open and fully closed for each port may be achieved.

The force balance equation that positions the valve shown in the FIGS. 1 & 2 is:

$$(F0_{63}+P_{37}*A_{37}+K_{63}dx_{41})-(F0_{61}+P_{64}*A_{64}-K_{61}*(dx_{41}+dx_{50})+K_{62}*dx_{50}+F_{fm}(I,dx_{50}))=0$$

where:

$F0_{xx}$ preload on the spring xx at closed position $dx_{xx}=0$

FF0 preload on flapper when TM current and pressures are 0

$dx_{xx}$ change in length of spring xx or position of component at issue $P_{xx}$ pressure in chamber xx (note $P_{64}$ is function of dx50 and $P_{37}$)

$A_{xx}$ area that pressure xx is acting on $K_{xx}$ spring rate of spring xx

I torque motor current $F_{fm}(I,dx_{50})$ flapper load as a function of current and flapper stroke.

Applicant has recognized some control features that can be utilized with such a valving system 20 due to the positioning extension 56 on the torque motor 42.

Figure 3A:
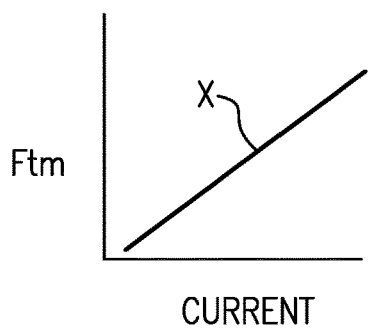
FIG. 3A shows the linear relationship between a torque motor force and the current provided to the torque motor.

First, as shown in FIG. 3A, there is a relationship X between the torque motor force $F_{fm}$ and current which is linear.

Figure 3B:
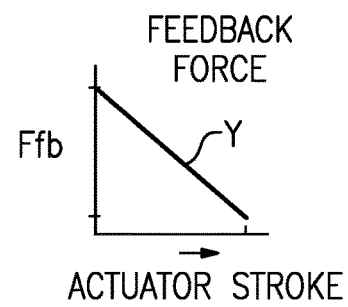
FIG. 3B shows the linear relationship between a feedback spring force and the stroke of an actuator piston.

Applicant has also recognized as shown in FIG. 3B that the feedback force of spring $F_{fb}$ has a linear relationship Y to actuator stroke.

By associating the feedback force $F_{fb}$ with the torque motor force $F_{fm}$, one can associate the feedback force $F_{fb}$ with current.

Figure 3C:
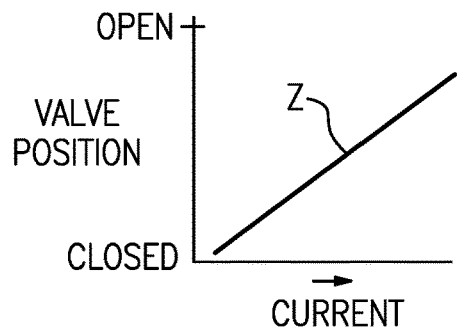
FIG. 3C shows the linear relationship between valve position and current.

Thus, as shown in FIG. 3C, the valve position has a linear relationship Z relative to the current.

Figure 4:
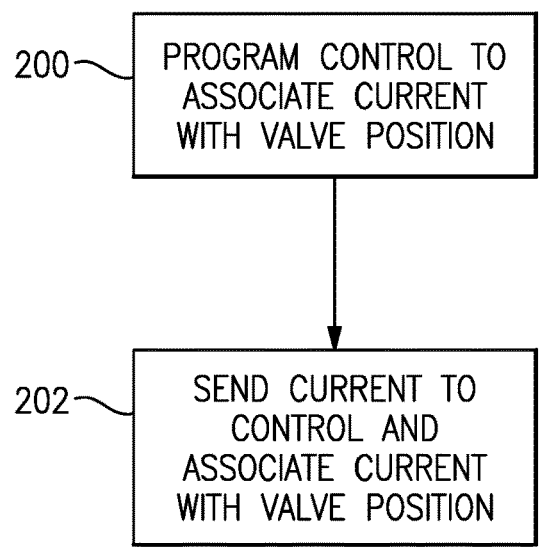
FIG. 4 is a flow chart of the control of valves coming within this disclosure.

FIG. 4 is a flow chart of operating the valving system 20 as disclosed in this application. As shown at step 200, in a first step a control for the valving system 20 is programmed to associate current with valve positioning.

At step 202, current is sent, and that current is then associated with a valve position.

The system operates as follows:

A helical compression spring 63 and pressure (in 37) act on small piston 19 to move the valve in the close direction (FIG. 1).

To open: An electrical signal is sent to the torque motor 42, which provides a force ($F_{tm}$) proportional to the current.

$F_{tm}$ applies a load to the armature, which pivots the armature 46 thereby lifting the flapper 50 off the nozzle 52 and provides servo pressure (from 19) to the servo cavity 64, this pressure provide the opening force on the valve 38.

Without feedback there is only one position of the armature which will create the servo pressure that will balance the loads on the piston. Note: The helical compression spring 63 rate is not high enough to provide controllable proportionality to the valve (this is due to the high range of pressure valve needs to operate at).

The flapper extension 56 adds feedback between the valve position and the torque motor.

The torque motor 42 force due to current application (I) is $F_{tm}$, as I increases the force $F_{tm}$ increase and opens the nozzle 52 to provide servo pressure. As the valve 38 opens, the feedback force, $F_{fb}$ on the armature decreases. As $F_{fb}$ decreases $F_1$ has more authority and counteracts some of the force $F_{tm}$ causing the nozzle 92 to close and reduce servo pressure. This integrates until at a fixed current the actuator system is in balance. For any given current this balance point will be different as $F_{tm}$ is directly proportional to the current. Also since the feedback is proportional to the valve position, the net effect is that the actuator is proportional to the current applied to the torque motor.

$F_{tm}$ is function of Current, F1 and $F_{fb}$, nozzle area is function of $F_{tm}$, $F_1$ and $F_{fb}$, servo pressure is function of nozzle area, valve position is function of servo pressure, $F_{fb}$ and $F_1$ are function of valve position. From this it is known that valve position has a linear relationship to current.

Stated slightly differently, we know $F_{tm}$ is proportional to current. The actuator continues to change position of the valve until $F_{net}$ balances with $F_{tm}$. $F_{net}$ equals Ft minus $F_{fb}$. The position of the valve is proportional to $F_{net}$ since at that point $F_{net}$ is equal to $F_{tm}$ and position is proportional to $F_{net}$, then the position of the valve is proportional to $F_{tm}$. Since $F_{tm}$ is proportional to current, position is also proportional to current. A worker designing a system under this disclosure could simply calibrate the control such that it associates a particular torque motor current with the exact position of the valve, then can rely upon knowing the position of the valve to a high degree of accuracy simply by knowing the current. In this manner the need for any position transducer is eliminated.

While a positioning valve is illustrated in FIGS. 1 and 2, any number of other valve applications can benefit from this disclosure.

As an example, FIG. 5A shows a surge bleed valve positioning system 70. Here, an engine 72 has a compressor surge bleed 74. A valving system 76 which may operate such as in the above disclosure controls the flow of the bleed line 74 to an outlet 77. The FADEC 78 controls current to the valving system 76 to achieve a desired valve position.

FIG. 5B shows a system 80 having manual positioning. A manual control 88 is utilized to control the flow of current to a valving system 84 which may be as disclosed above to control the flow between an inlet 82 and an outlet 86.

FIG. 5C shows a flow sharing application 90. Here a pair of sources of air 102 and 104 lead to valves 96 and 100, respectively. Pressure sensors 94 may be associated with each line 102 and 104. A FADEC controls the flow of air from inlets 102 and 104 to an outlet 92 through lines 91 and 93. Again, the valves 96 and 100 may operate as disclosed above.

FIG. 5D shows a bowed rotor modulation application. Here, a starter 118 is associated to start an engine 112. A speed reference sensor 114 may sense the speed of the engine and provide feedback to a FADEC 116. The FADEC supplies current to a valving system 120 which controls the flow of air from inlet 121 to outlet 119 heading to the starter 118 to control the engine. A rotor modulation mode may be utilized when initially starting an engine to allow the engine to speed up slowly to correct for a bowed rotor condition.

FIG. 5E shows a variable pressure regulator application 122. A desired pressure is sent from a reference pressure schedule 124 to a comparison node 132. Comparison node 132 receives signals from the pressure sensor 128 on an inlet line 126. Feedback from the comparison is sent to a FADEC 130 which controls the current supply to a valve system 134 to control the amount of fluid reaching an outlet 136.

A variable temperature control application 140 is illustrated in FIG. 5B. Here a temperature sensor 142 on a fluid line 150 is sent to a comparison member 146 which also receives a reference desired temperature 144. Feedback from the comparison is sent to a FADEC 148 which controls a valving system 160 which may be similar to the valving systems disclosed above. The valving system 160 controls the amount of air to a hot air application 154, and a line 152 receives cold air.

In sum, embodiments are disclosed which provide accurate feedback on the position of the valve member without the need of a position sensing transducer.

Although embodiments have been disclosed, a worker of skill in this art would recognize that modifications would come within the scope of this disclosure. For that reason, the following claims should be studied to determine the true scope and content of this disclosure.

What is claimed is:

1. A valving system comprising:
a valve member received within a fluid duct to control the flow of fluid between a duct inlet to a duct outlet;
an actuator member connected to move with an actuator piston and change the position of the valve member, said actuator piston moving within a housing, said housing defining a smaller face fluid chamber acting on a small area piston face, and there being a larger face fluid chamber, acting on a larger face of the actuator piston, said larger face being on a remote side of said piston from said small face of said piston;
a torque motor comprising an armature and a flapper caused to move by current received at the armature from a control, said flapper moving between two fluid ports to control the opening of the two fluid ports and control the pressure in the larger face chamber, said flapper further having a positioning extension, and said positioning extension engaging a first feedback spring operable between it and a forward face of said actuator piston providing a spring force in combination with a spring force from the positioning extension; and
said control being operable to provide current to said armature to control the fluid received in said larger face chamber from said first and second fluid ports, said control being programmed to associate the current supplied to the armature to an actual position of the valve member.

2. The valving system as set forth in claim 1, wherein a second feedback spring is positioned on a remote side of the positioning extension from the first feedback spring and resists the combined spring forces from the positioning extension and first feedback spring.

3. The valving system as set forth in claim 2, wherein said spring force from said first feedback spring combined with said positioning extension spring force and the spring force from said second feedback spring balance to reach an equilibrium position for said actuator piston.

4. The valving system as set forth in claim 3, wherein said valve member is a butterfly valve.

5. The valving system as set forth in claim 2, wherein one of said first and second ports communicates with pressure on a downstream side of the valve member and a second of the ports communicates with an ambient pressure, such that at a closed position the flapper closes said one port and opens said second port, and at a closed position the flapper closes said second port and opens said first port such that the pressure downstream of the valve member can move into said larger face chamber.

6. The valving system as set forth in claim 1, wherein a cylindrical member associated with the forward face of the actuator piston guides said first feedback spring, and a second cylindrical member associated with said positioning extension guides said second feedback spring.

7. The valving system as set forth in claim 6, wherein one of said first and second ports communicates with pressure on a downstream side of the valve member and a second of the ports communicates with an ambient pressure, such that at a closed position the flapper closes said one port and opens said second port, and at a closed position the flapper closes said second port and opens said first port such that the pressure downstream of the valve member can move into said larger face chamber.

8. The valving system as set forth in claim 6, wherein said spring force from said first feedback spring combined with said positioning extension spring force and the spring force from said second feedback spring balance to reach an equilibrium position for said actuator piston.

9. The valving system as set forth in claim 8, wherein said valve member is a butterfly valve.

10. The valving system as set forth in claim 8, wherein one of said first and second ports communicates with pressure on a downstream side of the valve member and a second of the ports communicates with an ambient pressure, such that at a closed position the flapper closes said one port and opens said second port, and at a closed position the flapper closes said second port and opens said first port such that the pressure downstream of the valve member can move into said larger face chamber.

11. The valving system as set forth in claim 1, wherein the valving system operates as a positioning valve.

12. The valving system as set forth in claim 1, wherein said valving system is utilized as a surge bleed valve for selectively opening a surge bleed line on a gas turbine engine compressor section.

13. The valving system as set forth in claim 1, wherein said control is associated with a manual control that controls the current to said valving system.

14. The valving system as set forth in claim 1, wherein there are two of said valving system for selectively providing control for two supplies of fluid leading to a single downstream use.

15. The valving system as set forth in claim 1, wherein the valving system is associated with a bowed rotor modulation functions for a starter for a gas turbine engine.

16. The valving system as set forth in claim 1, wherein the valving system is utilized to provide a desired pressure and sensing a pressure of fluid in the duct, and comparing that sensed pressure to a desired pressure, and adjusting current from the control to the valving system to move the pressure in the duct to approach the desired pressure.

17. The valving system as set forth in claim 1, wherein the valving system is utilized as a variable temperature control, and a temperature is sensed of fluid in the duct and compared to a desired temperature, and the controller then adjusting the current sent to said valving system based upon the comparison of temperatures.

18. The valving system as set forth in claim 1, wherein one of said first and second ports communicates with pressure on a downstream side of the valve member and a second of the ports communicates with an ambient pressure, such that at a closed position the flapper closes said one port and opens said second port, and at a closed position the flapper closes said second port and opens said first port such that the pressure downstream of the valve member can move into said larger face chamber.

19. The valving system as set forth in claim 1, wherein a first cylindrical member associated with a forward face of the actuator piston guides said first feedback spring, and a second cylindrical member associated with said positioning extension also guides said first feedback spring.

20. A method of operating a valving system comprising the steps of:
1) providing a valve member within a fluid duct to control the flow of fluid between a duct inlet and a duct outlet, providing an actuator member connected to move with an actuator piston and change the position of the valve member, providing a torque motor comprising an armature and a flapper caused to move by current received at the armature from a control, the flapper moving between first and second fluid ports to control the opening of the fluid ports, and the flapper further having a positioning extension and providing a feedback spring engaging the positioning extension between it and a forward face of the actuator position; and
2) programming said control to provide current to said armature to control fluid received in an actuator chamber between the first and second fluid ports to control a position of said valve member, and the positioning extension a applying an extension spring force in combination to a spring force from the first feedback spring on the valve member, said control programmed to associate the current control to an actual position of the valve member.

* * * * *